US012547777B2

(12) United States Patent
Bajaj et al.

(10) Patent No.: US 12,547,777 B2
(45) Date of Patent: Feb. 10, 2026

(54) SMART CONTRACT CONFIGURATION USING UNSTRUCTURED DATA

(71) Applicant: The Toronto-Dominion Bank, Toronto (CA)

(72) Inventors: Hitesh Bajaj, Duluth, GA (US); Milos Dunjic, Oakville (CA); David Samuel Tax, Toronto (CA); Jonathan Joseph Prendergast, West Chester, PA (US); Mohit Sharma, Toronto (CA); Thomas Osman Kelly, Wenonah, NJ (US); Pranay Chander Gupta, Toronto (CA); Kushank Rastogi, Toronto (CA); Abhijit Singha Hazari, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 34 days.

(21) Appl. No.: 18/769,537

(22) Filed: Jul. 11, 2024

(65) Prior Publication Data

US 2026/0017413 A1    Jan. 15, 2026

(51) Int. Cl.
*G06F 21/64*    (2013.01)
*G06F 16/2455*    (2019.01)
(Continued)

(52) U.S. Cl.
CPC .......... *G06F 21/64* (2013.01); *G06F 16/2455* (2019.01); *G06F 16/285* (2019.01);
(Continued)

(58) Field of Classification Search
None
See application file for complete search history.

(56) References Cited

U.S. PATENT DOCUMENTS 12,106,205 B1 *  10/2024  Jain ........................ G06N 3/084
2003/0130894 A1 *  7/2003  Huettner ............ G06Q 30/0257
                                                    709/200
(Continued)

FOREIGN PATENT DOCUMENTS

CN    117725594 A  *  3/2024
CN    117591625 B  *  4/2024   ........... G06F 16/316
(Continued)

*Primary Examiner* — Ali H. Cheema
(74) *Attorney, Agent, or Firm* — Rowand LLP

(57) ABSTRACT

A system for configuring a smart contract may receive unstructured data and identifying, based on the unstructured data, an intent to perform a transfer of data. The system may then identify, based on the unstructured data, parameters associated with the transfer of data. The parameters may include an amount of data to be transferred, a transferee, and at least one condition associated with the transfer of data. The system may then retrieve identifier data from a storage module, the identifier data including a first unique identifier. The system may then send, to a Large Language Model (LLM) via a first prompt engine module and an LLM Application Programming Interface (API), a prompt based on the unstructured data and the identifier data. The system may then receive LLM output from the LLM, and based on the LLM output, configure a smart contract. The LLM may be an artificial intelligence model.

21 Claims, 4 Drawing Sheets

(51) Int. Cl.
*G06F 16/28* (2019.01)
*G06F 16/3329* (2025.01)
*G06F 16/90* (2019.01)
*G06F 21/56* (2013.01)
*G06F 21/57* (2013.01)
*G06F 40/40* (2020.01)
*G06F 40/56* (2020.01)
*G06N 20/00* (2019.01)

(52) U.S. Cl.
CPC .......... *G06F 16/3329* (2019.01); *G06F 16/90* (2019.01); *G06F 21/56* (2013.01); *G06F 21/577* (2013.01); *G06F 40/40* (2020.01); *G06F 40/56* (2020.01); *G06F 2221/034* (2013.01); *G06N 20/00* (2019.01)

(56) References Cited

U.S. PATENT DOCUMENTS

| | | | |
|---|---|---|---|
| 2005/0182675 A1* | 8/2005 | Huettner | H04L 69/329 |
| | | | 705/14.66 |
| 2022/0138243 A1* | 5/2022 | Palagummi | G06F 16/953 |
| | | | 707/737 |
| 2023/0031327 A1* | 2/2023 | Bourbie | G06F 16/90324 |
| 2024/0256678 A1* | 8/2024 | Thompson | G06F 21/577 |
| 2024/0296295 A1* | 9/2024 | Russell | G06F 40/56 |
| 2024/0386103 A1* | 11/2024 | Clement | G06F 21/56 |
| 2024/0406124 A1* | 12/2024 | Cunningham | G06N 3/0455 |
| 2025/0078648 A1* | 3/2025 | Ramanasankaran | G08B 21/00 |
| 2025/0095035 A1* | 3/2025 | Kuan | G06F 40/40 |
| 2025/0119396 A1* | 4/2025 | Taheri | H04L 51/02 |
| 2025/0131247 A1* | 4/2025 | Mondlock | G06N 5/022 |
| 2025/0133042 A1* | 4/2025 | Tsvetkov | G06F 40/174 |
| 2025/0252376 A1* | 8/2025 | Singh | G06F 9/454 |
| 2025/0265271 A1* | 8/2025 | Paulson | G06F 16/285 |

FOREIGN PATENT DOCUMENTS

| | | | | |
|---|---|---|---|---|
| CN | 120179212 A | * | 6/2025 | ........... G06F 21/577 |
| WO | WO-2024233674 A2 | * | 11/2024 | ............... H04L 9/50 |

* cited by examiner

SMART CONTRACT CONFIGURATION USING UNSTRUCTURED DATA

TECHNICAL FIELD

The present disclosure relates to systems and methods for the configuration and deployment of smart contracts.

BACKGROUND

A smart contract is a self-executing contract with the terms of the agreement directly written into code. A smart contract may operate on a blockchain network and may automatically enforce the terms of the contract when certain predefined conditions are met. Smart contracts typically execute without the need for intermediaries, providing transparency, security, and efficiency in transactions. As such, they have become an attractive option for a wide range of applications in various industries.

In recent years, the popularity of blockchain transactions, such as smart contracts, has increased. As blockchain technology continues to evolve and mature, the adoption of smart contracts is expected to increase further.

At present, in order to effect a smart contract, a user must take certain steps which may be complex, time-consuming, and error-prone.

Improvements to the field are desired.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION

Figure 1:
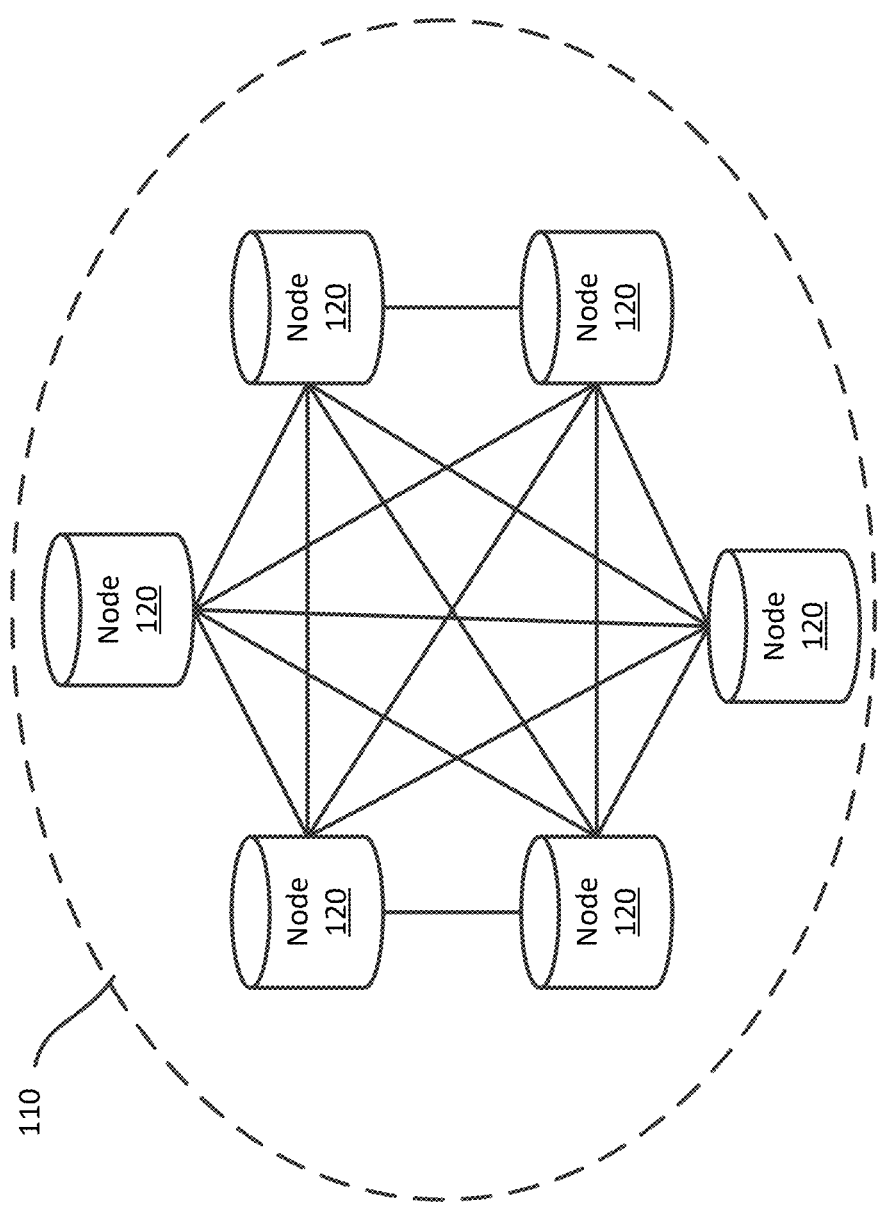
FIG. 1 illustrates an example blockchain network, in accordance with embodiments of the present disclosure.

In accordance with one aspect of the present disclosure, there is provided a computer system for configuring a smart contract based on unstructured data. The computer system comprises a processor, a communications module coupled to the processor, a storage module coupled to the processor, and a memory coupled to the processor, the memory storing instructions that, when executed, configure the processor to: receive unstructured data; identify, based on the unstructured data, an intent to perform a transfer of data; identify, based on the unstructured data, parameters associated with the transfer of data, the parameters including an amount of data to be transferred, a transferee, and at least one condition associated with the transfer of data; retrieve identifier data from the storage module, the identifier data including a first unique identifier; send, to a Large Language Model (LLM) via a first prompt engine module and an LLM Application Programming Interface (API), a prompt based on the unstructured data and the identifier data; receive LLM output from the LLM; and based on the LLM output, configure a smart contract.

In some implementations, the processor is further caused to deploy the smart contract to a blockchain network.

In some implementations, prior to deploying the smart contract, the processor is further caused to: send, to a client device associated with the first unique identifier, a request for confirmation; and receive, from the client device, the confirmation.

In some implementations, prior to configuring the smart contract, the processor is further caused to: send, to a client device associated with the first unique identifier, a request for additional data; and receive, from the client device, the additional data. The smart contract may be configured further based on the additional data.

In some implementations, the identifier data further includes a second unique identifier, the second unique identifier being associated with the transferee.

In some implementations, the unstructured data has been converted, using a speech recognition module, from an audio stream of data.

In some implementations, identifying the intent to perform the transfer of data includes sending, via a second prompt engine module and the LLM API, the unstructured data to the LLM.

In some implementations, identifying the intent to perform the transfer of data includes performing a keyword search of the unstructured data.

In some implementations, identifying the parameters associated with the transfer of data includes sending, via a second prompt engine module and the LLM API, the unstructured data to the LLM.

In some implementations, the at least one condition includes a triggering condition. The triggering condition may be used to configure the smart contract.

In some implementations, the at least one condition includes a condition to minimize an input-output modifier.

In some implementations, configuring the smart contract includes configuring the smart contract using one or more further LLMs.

In some implementations, configuring the smart contract using one or more further LLMs includes writing a smart contract using a second LLM and translating the written smart contract to a specific blockchain language using a third LLM.

In accordance with another aspect of the present disclosure, there is provided a computer-implemented method. The method comprises: receiving unstructured data; identifying, based on the unstructured data, an intent to perform a transfer of data; identifying, based on the unstructured data, parameters associated with the transfer of data, the parameters including an amount of data to be transferred, a transferee, and at least one condition associated with the transfer of data; retrieving identifier data, the identifier data including a first unique identifier; sending, to an LLM via a first prompt engine module and an LLM API, a prompt based on the unstructured data and the identifier data; receiving LLM output from the LLM; and based on the LLM output, configure a smart contract.

In some implementations, the method further comprises deploying the smart contract to a blockchain network.

In some implementations, prior to deploying the smart contract, the method further comprises: sending, to a client device associated with the first unique identifier, a request for confirmation; and receiving, from the client device, the confirmation.

In some implementations, prior to configuring the smart contract, the method further comprises: sending, to a client device associated with the first unique identifier, a request for additional data; and receiving, from the client device, the additional data. The smart contract may be configured further based on the additional data.

In some implementations, the identifier data further includes a second unique identifier, the second unique identifier being associated with the transferee.

In some implementations, the unstructured data has been converted, using a speech recognition module, from an audio stream of data.

In some implementations, identifying the intent to perform the transfer of data includes sending, via a second prompt engine module and the LLM API, the unstructured data to the LLM.

In some implementations, identifying the intent to perform the transfer of data includes performing a keyword search of the unstructured data.

In accordance with yet another aspect of the present disclosure, there is provided a non-transitory computer readable storage medium comprising processor-executable instructions which, when executed, configure a processor to: receive unstructured data; identify, based on the unstructured data, an intent to perform a transfer of data; identify, based on the unstructured data, parameters associated with the transfer of data, the parameters including an amount of data to be transferred, a transferee, and at least one condition associated with the transfer of data; retrieve identifier data, the identifier data including a first unique identifier; send, to an LLM via a first prompt engine module and an LLM API, the unstructured data and the identifier data; and receive LLM output from the LLM; and based on the LLM output, configure a smart contract.

Other aspects and features of the present application will be understood by those of ordinary skill in the art from a review of the following description of examples in conjunction with the accompanying figures.

In the present application, the term "and/of" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A smart contract is an agreement that automatically executes when predetermined conditions are met. In the context of the present disclosure, a smart contract refers to a computer program or transaction protocol that may be deployed on a blockchain. These smart contracts enable functionalities such as transferring digital assets, managing digital identities, and executing complex transfers of data, for example, without the need for intermediaries such as legal systems or banks. Most smart contracts are deployed on the Ethereum blockchain.

A blockchain is a distributed ledger comprising a consensus of replicated, shared, and synchronized digital data that is geographically spread over many distributed computer nodes connected by a network. The distributed computer nodes may be located across many sites, countries, and/or institutions. In a blockchain network, the distributed computer nodes maintain a global ledger of all transactions on the blockchain, grouped into blocks, each of which contains a hash of the previous block in the chain. Each transaction is a data structure that encodes some data or state. In many cases, the data recorded in a transaction involves the transfer of control of a digital asset between participants in the blockchain system, and includes at least one input and at least one output. In some cases, the transaction may invoke code recorded in another transaction on the blockchain. That code, which may be referenced and executed by having it invoked by a further transaction, may be referred to as a "smart contract".

In the Ethereum network, the cost of having a transaction included in a block may include both a transaction fee and a "gas" cost, where the gas cost refers to a cost attributable to the number and/or complexity of code operations required by the transaction.

"Digital assets" refer to assets that are in digital format and that come with the right to use. In particular, a digital asset is self-contained, uniquely identifiable, and is associated with a defined value or ability to use. Examples of digital assets include, among others, digital documents, multimedia files (e.g., photos, audiovisual media, animations, etc.), electronic mails, websites, cryptocurrencies, digital art, digital representations of physical assets (such as real estate or commodities), virtual goods in video games, and asset-backed tokens.

A user may interact with a blockchain network via a digital wallet. To deploy a smart contract, a transaction may be initiated from a digital wallet. Once a smart contract is deployed and resides on a blockchain network, the digital wallet may be used to interact with the deployed smart contract.

Reference is first made to FIG. 1, which illustrates, in block diagram form, an example computing network associated with a blockchain network 110. The blockchain network 110 is a peer-to-peer membership network. Distributed electronic devices running an instance of a consensus protocol under which the blockchain operates may participate in the blockchain network 110. Such distributed electronic devices may be referred to as nodes 120. The consensus protocol may be, for example, a proof-of-work (PoW) protocol, a proof-of-stake (PoS) protocol, a delegated proof-of-stake (DPoS) protocol, or a Byzantine fault tolerance (BFT). The blockchain network 110 is operable to store and execute one or more smart contracts.

Nodes 120 maintain a global ledger of all transactions on the distributed ledger. The global ledger is a distributed ledger and each node may store a complete copy or a partial copy of the global ledger. Transactions by a node 120 affecting the global ledger are verified by other nodes 120 so that the validity of the global ledger is maintained.

The details of implementing and operating a blockchain network 110 will be appreciated by those ordinarily skilled in the art.

The electronic devices that run the consensus protocol and that form the nodes 120 of the blockchain network 110 may be of various types including, for example, computing devices such as computer servers, desktop computers, laptop computers, tablet computers, servers, mobile devices such as smartphones, wearable computers such as smart watches or other electronic devices.

Nodes 120 of the blockchain network 110 are coupled to one another using suitable communication technologies which may include wired and wireless communication technologies. In many cases, the blockchain network 110 is implemented at least partly over the Internet, and some of the nodes 120 may be located in geographically dispersed locations.

Figure 2:
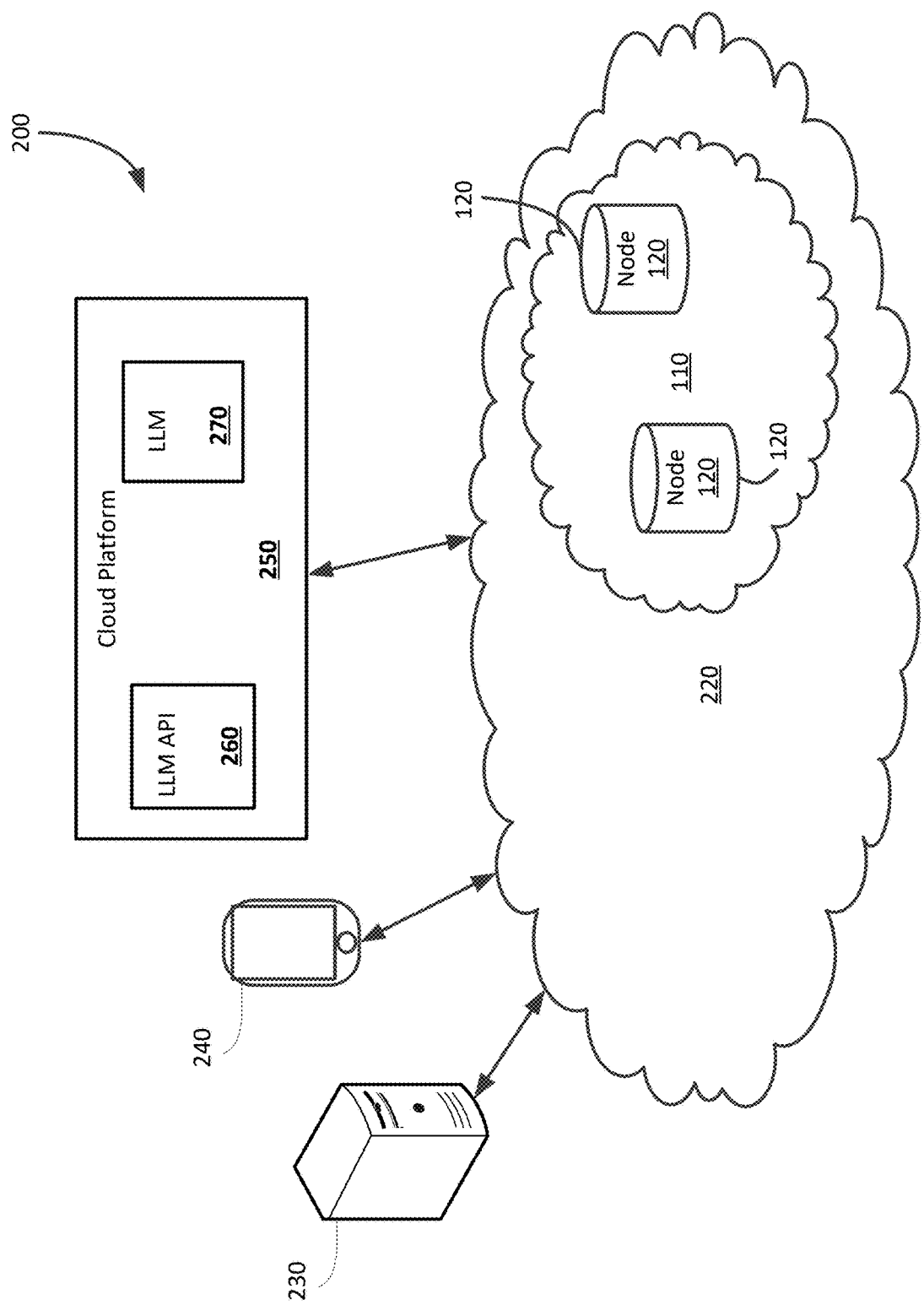
FIG. 2 illustrates an example operating environment of an example embodiment, in accordance with embodiments of the present disclosure.

FIG. 2 illustrates an exemplary computing environment 200 consistent with certain disclosed embodiments. As shown in FIG. 2, the computing environment 200 may a first server 230, a client device 240, a cloud platform 250, and a communications network 220 connecting one or more of the components of computing environment 200. The communications network 220 may include one or more wired or wireless networks, including the Internet. As further shown, the exemplary computing environment 200 further includes a blockchain network 110, which is shown deployed within and as part of the communications network 220. In some cases, the first server 230 and the client device 240 each may serve as one of the nodes 120 of the blockchain network 110. In some cases, one or more of the first server 230 and the client device 240 may not function as one of the nodes 120 and may send and receive blockchain-related data, such as transactions, via one or more of the nodes 120 in the blockchain network 110. One or more of the first server 230 and the client device 240 may employ various APIs or other functions to securely communicate with the one or more nodes 120 in order to exchange blockchain data, messaging and instructions.

The cloud platform 250 is a collection of computing resources, including servers, managed by a cloud service provider. While FIG. 2 illustrates a single cloud platform, in some embodiments, one or more cloud platforms 250 may be included in an operating environment of the present disclosure.

The cloud platform 250 may comprise data centers located in various remote locations. Each data center may comprise multiple physical servers. The cloud platform 250 may host a plurality of digital assets such as websites, applications database, and files, for example. Examples of cloud platforms include Amazon Web Services (AWS), Microsoft Azure, and Google Cloud Platform (GCP), for example.

The cloud platform 250 is shown hosting an LLM 270 and an LLM API 260. The LLM 270 is a type of artificial intelligence (AI) model designed to understand and generate natural-language input, including human-like text. The LLM 270 may be trained on huge datasets containing a wide range of text from sources such as the internet, books, articles, and other sources to learn the patterns, structures, and nuances of language. In this way, the LLM 270 may comprehend natural-language input, including human-like text, and generate appropriate responses.

The LLM 270 maybe configured to perform a variety of language-related tasks, such as text generation, translation, summarization, question answering, etc. In this way, the LLM 270 may generate coherent and contextually relevant responses to text prompts.

The LLM 270 may be, for example, one of the OpenAPI™ Generative Pre-trained Transformer (GPT) series, such as GPT-1, GPT-2, GPT-3, and GPT-4. Alternatively, the LLM 270 may be a Bidirectional Encoder Representations from Transformers (BERT), a Text-To-Text Transfer Transformer (T5), an XLNet™, Robustly Optimized BERT Approach (RoBERTa), or a Turing-Natural Language Generation (Turing-NLG).

The LLM API 260 is an interface configured to provide access to the LLM 270. The LLM API 260 may be, for example, an OpenAPI™ GPT API, a Google™ Cloud Natural Language API, a Microsoft Azure™ Cognitive Services API, or a Hugging Face™ Transformers API, for example.

The first server 230, the client device 240, and the nodes 120 are computer systems. Computer systems may be, for example, a mainframe computer, a minicomputer, or the like. Computer systems may include one or more computing devices. For example, a computer system may include multiple computing devices such as, for example, database servers, computer servers, and the like. The multiple computing devices may be in communication using a computer network. For example, computing devices may communicate using a local-area network (LAN). In some embodiments, computer systems may include multiple computing devices organized in a tiered arrangement. For example, a computer system may include middle-tier and back-end computing devices. In some embodiments, a computer system may be a cluster formed of a plurality of interoperating computing devices.

The first server 230 may a single server, multiple servers, a server farm, or any other such arrangement of computing devices to implement computing server-like functionality. In some embodiments, the first server 230 may track, manage, and maintain resources belonging to respective entities. The resources may be represented in a database, which may be provided in secure storage(s). The secure storage(s) may be provided internally within the first server 230, or externally. The secure storage(s) may, for example, be provided remotely from the first server 230. For example, the secure storage(s) may include one or more data centers. The data centers may, for example, store data with bank-grade security.

The resources may, for example, be computer code, spreadsheet data, and/or database information and may include image, text, audio and/or video files. Additionally or alternatively, the resources may be computing resources, such as memory or processor cycles. Additionally or alternatively, the resources may be digital goods, such as digital media resources; fonts, logos, photos and graphics; digital subscriptions; online advertisements; internet coupons; electronic tickets; electronic documentation; downloadable software and/or mobile apps; cloud-based applications and online games; virtual goods used within the virtual economies of online games and communities; workbooks; worksheets; planners; e-learning (online courses); webinars, video tutorials; blog posts; cards; patterns; website themes; and/or templates. Examples of digital media resources include e-books, downloadable music, internet radio, internet television and/or streaming media. The resources may be a specific type of digital goods known as digital assets, and may include photography, logos, illustrations, animations, audiovisual media, presentations, spreadsheets, digital paintings, word documents, electronic mails, websites, and a multitude of other digital formats and their respective metadata. Digital assets may include non-fungible tokens (NFTs). Digital assets may be subject to digital rights management (DRM) and/or digital asset management (DAM). By way of further example, the resources may be database resources, and may represent stored value, such as financial instruments, including fiat currency and cryptocurrency. In at least some implementations, the resources may be or include digital goods which are exchange mediums. For example, the digital goods may be or represent monetary instruments.

In some embodiments, the first server 230 may include records for a plurality of resource accounts and at least some of the records may define a quantity of resources. A first entity may be associated with one or more accounts storing or otherwise reflecting owned resources, i.e., an owned resource account. The records may reflect a first quantity of stored resources that are associated with the first entity. Such resources may include owned resources. The amount of resources associated with the entity may be reflected by a resource definition defined in an associated resource record. The resource definition may be or include a balance defined in an associated record; for example a bank balance. In some implementations, the resource definition may define one or more digital goods and/or digital assets that are associated with the first entity.

In some examples, one or more of the plurality of resource accounts may be associated with a unique identifier. The unique identifier may be used as an "address" to provide for the sending of data transfers to the entity associated with a particular resource account and for the requesting of transfers of data from the entity associated with the particular resource account. The unique identifier may be a blockchain address, such as an Ethereum address.

For example, an entity, Mary Jones, may be associated with one or more accounts associated with the first server 230. Mary Jones may be associated with a unique identifier, and the association between Mary Jones and the unique identifier may be stored by the first server 230 in the storage module 350 (FIG. 3), for example. The unique identifier may be a blockchain address, such as an Ethereum address.

In some examples, the first server 230 may store an "address book" in connection with one or more entities to facilitate data transfers initiated by the one or more entities. The "address book" may provide a correspondence between each of a number of unique identifiers and one or more aliases, and the aliases may be determined by the entity associated with the address book.

For example, the first server 230 may store, in the storage module 350 (FIG. 3) for example, an "address book" in connection with the example entity Mary Jones. The address book may provide a mapping between aliases of Mary's potential transferees and the unique identifiers corresponding to the potential transferees.

For example, one of Mary's potential transferees may be John Michael Brown of 123 Smart Street, Toronto, Ontario, Canada. Mary's address book may store a mapping between the name, "John Michael Brown, 123 Smart Street, Toronto, Ontario, Canada" and a unique identifier associated with this potential transferee. As Mary may sometimes refer to John Michael Brown by the aliases of "John Brown", "John", "Uncle John", and "Johnny-Boy", these aliases may be further mapped to the unique identifier associated with this potential transferee.

As a further example, another one of Mary's potential transferees may be Ontario Power Generation, Inc. Mary's address book may store a mapping between the name, "Ontario Power Generation, Inc." and the unique identifier associated with this potential transferee. As Mary may sometimes refer to Ontario Power Generation, Inc. as "Ontario Power", "Hydro", and "the utility company" these aliases may be further mapped to a unique identifier associated with Ontario Power Generation, Inc. As noted, the unique identifier may be, for example, a blockchain address such as an Ethereum address.

In some embodiments, the first server 230 may be, for example, a financial provider server and a first entity may be a customer of the respective financial institution operating the associated financial institution server.

In some embodiments, the first server 230 may include a speech recognition module and/or a keyword search application.

In some embodiments, the first server may include one or more prompt engine modules. The one or more prompt engine modules may be configured to generate and send prompts to an LLM API.

In some embodiments, a first prompt engine module may be configured to generate a first prompt, based on unstructured data, to prompt an LLM, via an LLM API, to generate a smart contract and/or a smart contract prototype based on the unstructured data. The first prompt engine module may be configured to receive unstructured data in connection with an intent to transfer data, and to generate, based on the received unstructured data, one or more prompts based on the unstructured data. The generated prompts may be configured to cause an LLM to generate LLM output, based upon which, a smart contract may be configured. The smart contract may be configured using one or more LLMs. For example, configuring the smart contract may include configuring the smart contract using one or more further LLMs. In some implementations, configuring the smart contract using one or more further LLMs may include writing a smart contract using a second LLM and, in at least some implementations, translating the written smart contract to a specific blockchain language using a third LLM.

In some embodiments, a second prompt engine module may be configured to generate a second prompt, based on the unstructured data, to prompt an LLM, via an LLM API, to identify an intent to transfer data based on the unstructured data. The second prompt engine module may be configured to receive unstructured data, and to generate, based on the received unstructured data, a response indicating an intent to transfer data.

In some embodiments, a third prompt engine module may be configured to generate a third prompt, based on the unstructured data, to prompt an LLM, via an LLM API, to identify an parameters associated with the transfer of data, the parameters including an amount of data to be transferred, a transferee, and at least one condition associated with the data.

The client device 240 may take a variety of forms such as a smartphone, a tablet computer, a wearable computer such as a head-mounted display or smartwatch, a laptop or desktop computer, or a computing device of another type. The client device 240 may also be referred to as an electronic device.

The client device 240 is a computing device that may be associated with a first entity, such as a user or client, having a record in a database associated with and/or provided by the first server 230. The record may be or may represent account data. The record may include data of various types and the nature of the data may depend upon the nature of the first server 230.

In at least some embodiments, the client device 240 may have resident thereon a wallet application. The wallet application may be a standalone mobile application, a web application accessible via a web browser, or a desktop application. The wallet application may be an application that provides for interaction with an account, such as a blockchain network account. For example, the wallet application may provide for the viewing of balances and transactions history, the sending of transactions, the encryption and/or signing of information, and for connection to other applications. The wallet application may store various types of data, such as keys (e.g., public and/or private keys) for cryptocurrency transactions and digital assets (e.g., tokens such as NFTs).

Figure 3:
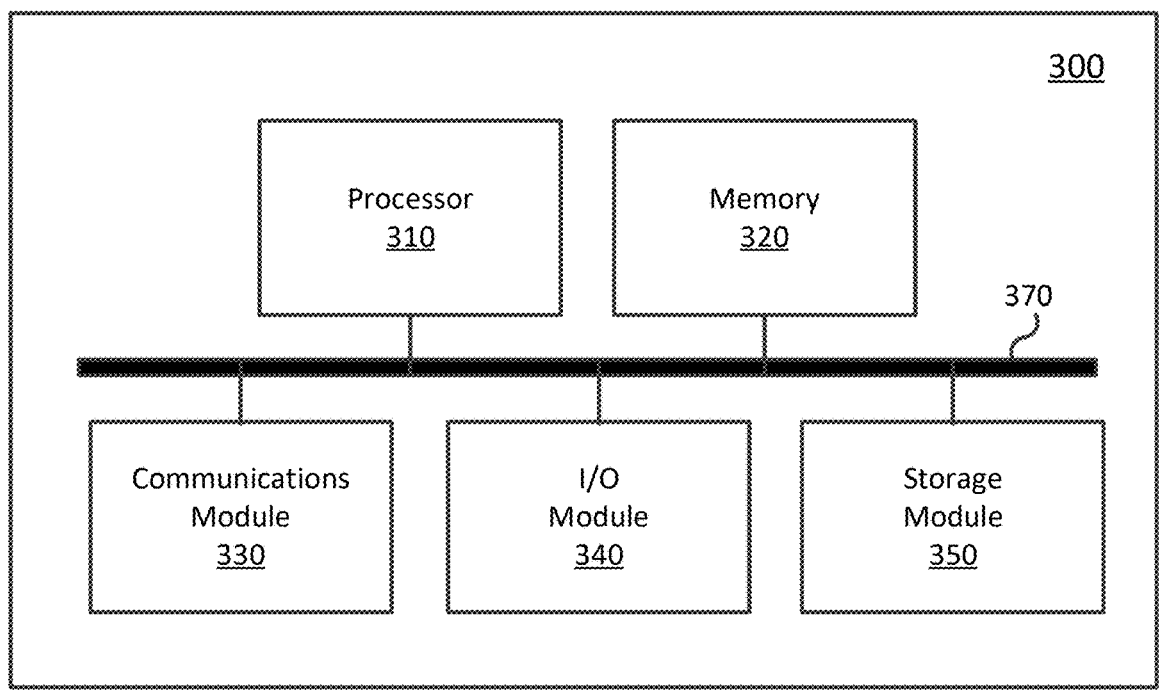
FIG. 3 is a high-level schematic diagram of a computing device, in accordance with embodiments of the present disclosure.

FIG. 3 is a simplified schematic diagram showing components of an exemplary computing device 300. Nodes 120 (FIG. 1), the first server 230, (FIG. 2) and the client device 240 (FIG. 2) may be of the same type as computing device 300.

The computing device 300 includes a variety of modules. For example, as illustrated, the example computing device 300 may include a processor 310, a memory 320, a communications module 330, an Input/Output (I/O) module 340, and/or a storage module 350. As illustrated, the foregoing example modules of the example computing device 300 are in communication over a bus 370. As such, the bus 370 may be considered to couple the various modules of the computing device 300 to each other, including, for example, to the processor 310.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computing device 300.

The communications module 330 allows the computing device 300 to communicate with various communications networks and/or other computing devices, such as, for example, the other nodes 120 (FIG. 1) of the blockchain network 110. For example, the communications module 330 may allow the computing device 300 to send or receive communications signals. Communications signals may be sent or received according to one or more protocols or according to one or more standards. The communications module 330 may allow the computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 330 may allow the computing device 300 to communicate using near-field communication (NFC), via Wi-Fi™, using Bluetooth™ or via some combination of one or more networks or protocols. In some embodiments, all or a portion of the communications module 330 may be integrated into a component of the computing device 300. For example, the communications module 330 may be integrated into communications circuitry, such as a communications chipset.

The I/O module 340 is an input/output module. The I/O module 340 allows the computing device 300 to receive input from and/or to provide input to components of the computing device 300 such as, for example, various input modules and output modules. For example, the I/O module 340 may allow the computing device 300 to receive input from and/or provide output to a display (not shown).

The storage module 350 allows data to be stored and retrieved. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in/from a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 330. In some embodiments, the storage module 350 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
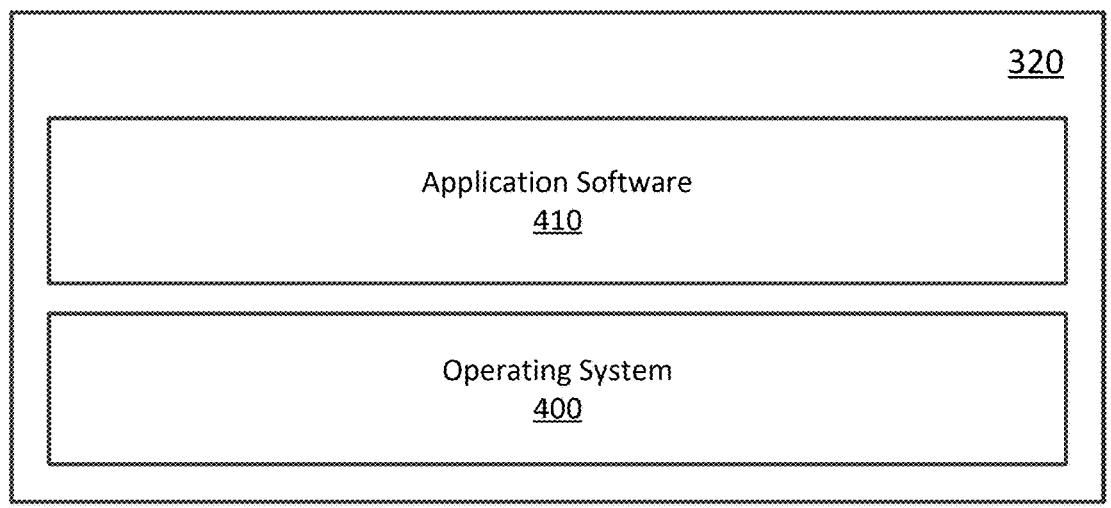
FIG. 4 shows a simplified organization of software components stored in a memory of the computing device of FIG. 3.

FIG. 4 depicts a simplified organization of software components stored in the memory 320 of the computing device 300. As illustrated, these software components include an operating system 400 and an application software 410.

The operating system 400 is software. The operating system 400 allows the application software 410 to access the processor 310 (FIG. 3), the memory 320, the communications module 330, the I/O module 340, and the storage module 350 of the computing device 300. The operating system 400 may be, for example, Google™ Android™, Apple™ iOS™, UNIX™, Linux™, Microsoft™ Windows™, Apple OSX™ or the like.

The application software 410 adapts the computing device 300, in combination with the operating system 400, to operate as a device for the deployment of smart contracts in a blockchain network.

Figure 5:
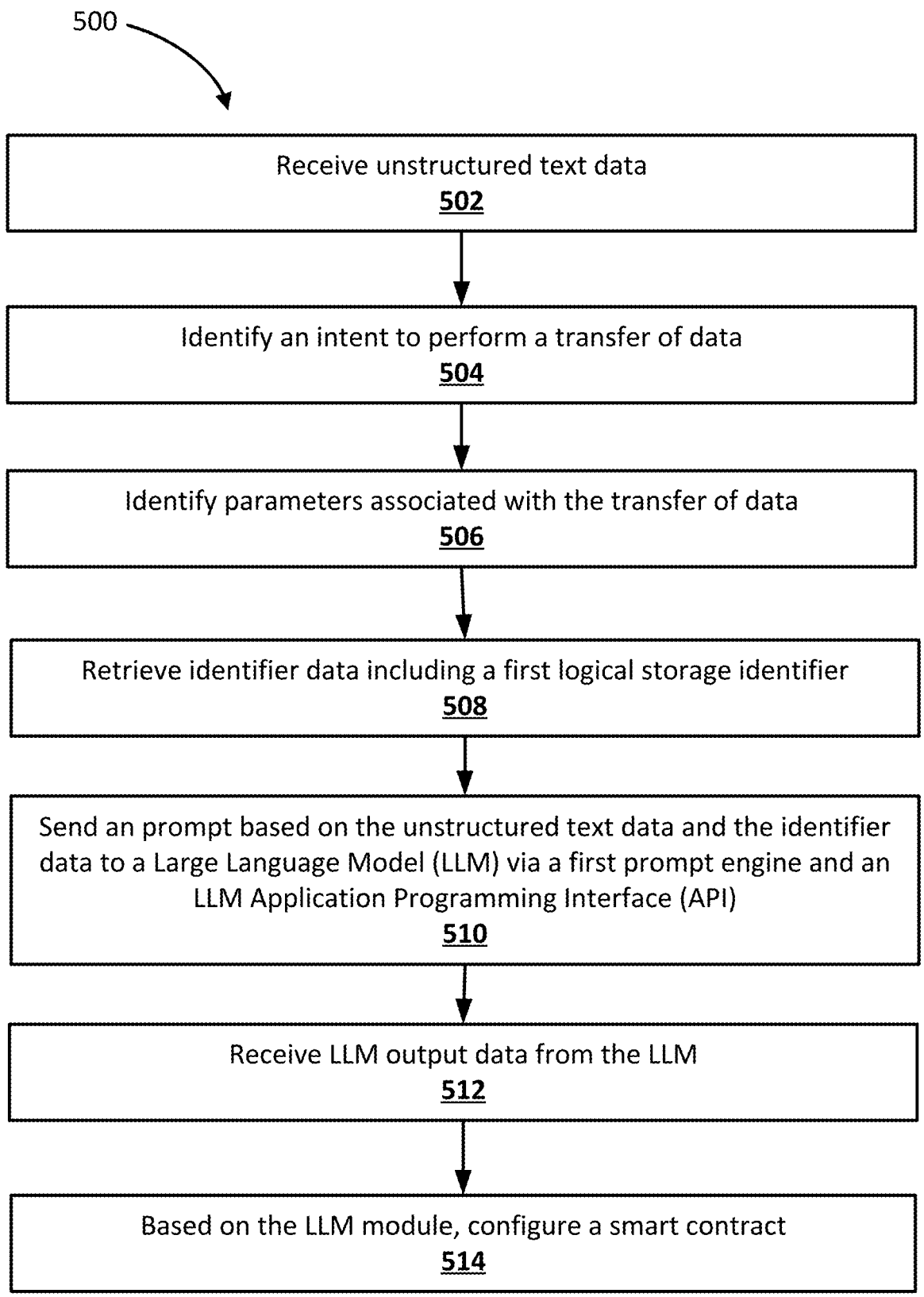
FIG. 5 illustrates, in flowchart form, one example method for configuring a smart contract, in accordance with examples of the present disclosure.

Reference is now made to FIG. 5, which illustrates a flowchart of an example method 500 for configuring a smart contract, in accordance with embodiments of the present disclosure. FIG. 5 shows operations performed by a computing system, such as the first server 230 (FIG. 2). For example, in at least some implementations, computer-executable instructions stored in memory associated with the computing system may configure the computing system to perform the operations of the method 500 or a portion thereof. By way of example, the computer-executable instructions may cause a processor associated with the computing system to perform the method 500 or a portion of the method 500.

The computing system performing the method 500 may cooperate with other computing systems using a communications module 330 (FIG. 3). The communications module 330 (FIG. 3) may be or include a hardware communications module. By way of example, with reference to FIG. 2, the first server 230 may communicate with one or more of the client device 240, the cloud platform 250, and/or one or more nodes 120 of the blockchain network 110, in order to perform the method 500 or a variation thereof.

At the operation 502, the system receives unstructured data.

The unstructured data may be received from the client device 240. In some embodiments, the unstructured data may correspond to a text transcript of an audio stream of data created by a user of the client device 240. In some embodiments, the unstructured stream of data may have been converted, using a speech recognition module, from the audio stream of data.

At the operation 504, the system identifies, based on the unstructured data, an intent to perform a transfer of data.

In some embodiments, the system may include a keyword search application, and the keyword search application may be configured to search within the unstructured data for certain words or phrases indicating an intent to perform a transfer of data. For example, the keyword search application may search for words such as "transfer", "send", "pay", etc. Where the certain words or phrases are identified by the keyword search application, the system may identify an intent to perform a transfer of data.

Alternatively, in some embodiments where the system includes a second prompt engine module, the system may be configured to provide the unstructured data to the second prompt engine module. As noted, the second prompt engine module may be configured to receive the unstructured data, generate a second prompt based on the unstructured data, and send the second prompt to an LLM API, such as LLM API 260 (FIG. 1). The second prompt may be configured to prompt an LLM, via an LLM API, to identify, based on the received unstructured data, an intent to transfer data, and to provide an indication of the intent to transfer data to the system.

At the operation 506, the system identifies, based on the unstructured data, parameters associated with the transfer of data, the parameters including an amount of data to be transferred, a transferee, and at least one condition associated with the transfer of data.

In some embodiments, the system may include a third prompt engine module, and may be configured to provide the unstructured data to the third prompt engine module subsequent to identifying the intent to perform a transfer of data. As noted, the third prompt engine module may be configured to receive the unstructured data, generate a third prompt based on the unstructured data, and send the third prompt to an LLM API, such as LLM API 260 (FIG. 1). The third prompt may be configured to prompt an LLM, via an LLM API, to identify, based on the received unstructured data, parameters associated with the transfer of data, including an amount of data to be transferred, a transferee, and at least one condition associated with the transfer of data.

In some embodiments, identifying the parameters associated with the transfer of data includes sending, via a third prompt engine module and the LLM API, the unstructured data to the LLM.

As noted, the unstructured data may include an instruction to perform a transfer of data, and parameters associated with the transfer of data, such as an amount of data to be transferred, a transferee, and at least one condition associated with the transfer of data.

As a first example, the instruction may be, "Pay John $500 when I receive the money from Amy". In this first example, the amount of data to be transferred is $500, the transferee is John, and an at least one condition is "when I receive the money from Amy". As a second example, the instruction may be "Pay my utility bill as late as possible". In this second example, the amount of data to be transferred is the amount of the utility bill, the transferee is the utility company, and an at least one condition is "as late as possible". As a third example, the instruction may be "Pay my Acme bill as cheaply as possible." In this third example, the amount of data to be transferred is the amount of the Acme bill, the transferee is the Acme company, and an at least one condition is "as cheaply as possible".

The unstructured data may include at least one condition, and the at least one condition may include a triggering condition. The triggering condition may be used to configure the smart contract.

Returning to the first example, the instruction may be "Pay John $500 when I receive the money from Amy". The triggering condition may be "when I receive the money from Amy".

The unstructured data may include at least one condition, and the at least one condition may include a condition to minimize an input-output modifier. Returning to the third example, the instruction may be "Pay my Acme bill as cheaply as possible." In this third example, the condition to minimize an input-output modifier may be, "as cheaply as possible".

Examples of an input-output modifiers may include costs. As will be known to those skilled in the art, there may be costs associated with the execution of a smart contract. For example, in the Ethereum network the cost of having a transaction included in a mined block may include both a transaction fee and a "gas" cost, where the gas cost refers to a cost attributable to the number and/or complexity of code operations required by the transaction. For instance, if a transaction event calls a particular portion of a smart contract, the gas price may depend on the number (or complexity) of computing operations involved in the Ethereum virtual machine executing that portion of the smart contract.

In some implementations, certain costs may be minimized by postponing the deployment of a smart contract. However, in some implementations, there may be certain other costs associated with postponing the deployment of a smart contract, such as late fees. Inn some implementations, the second prompt may be configured to minimized input-output modifiers, such as costs.

At the operation 508, the system retrieves identifier data from a storage module, the identifier data including a first unique identifier.

For example, as noted, the first server 230 may operate as the computing device 300 and may include a storage module 350 (FIG. 3). As noted, the first server may track, manage, and maintain resources belonging to respective entities, and may store, in the storage module 350 (FIG. 3) a unique identifier in connection with the entity. The unique identifier may be, for example, a blockchain address such as an Ethereum address. The first server 230 may retrieve, from the storage module, the first unique identifier.

In some embodiments, the identifier data may further include a second unique identifier, and the second unique identifier may be associated with the transferee.

For example, as noted, the first server may track, manage, and maintain resources belonging to respective entities, and may store, in the storage module 350 (FIG. 3) a unique identifier in connection with the entity, and an "address book" in connection with an entity. The address book may provide a mapping between aliases of the entity's potential transferees and the unique identifiers, which may be blockchain addresses, corresponding to the potential transferees. The first server 230 may retrieve, from the storage module, via an address book associated with the entity, a second unique identifier associated with the transferee.

At the operation 510, the system may send, to an LLM, via a first prompt engine module and an LLM API, a prompt based on the unstructured data and the identifier data.

As noted, in some embodiments, the first server 230 (FIG. 2) may include one or more prompt engine modules. The one or more prompt engine modules may be configured to generate and send prompts to an LLM API.

With reference again to FIG. 2, The first server 230 may generate, via a first prompt engine module, a first prompt based on unstructured data and the identifier data. The first server 230 may send the first prompt to the LLM 270 via the LLM API 260. In response to receiving the first prompt, the LLM 270 may generate, based on the unstructured data and the identifier data, LLM output, based upon which, a smart contract may be configured. The LLM output may be a smart contract or a smart contract prototype.

At the operation 512, the system receives LLM output from the LLM.

With reference again to FIG. 2, as noted the LLM 270 may generate, based on the unstructured data and the identifier data, LLM output, based upon which, a smart contract may be configured. The LLM output may be a smart contract or a smart contract prototype. The LLM 270 may then send, to the first server 230, the LLM output.

In some embodiments, subsequent to receiving a smart contract prototype, the system may send, to a client device associated with the first unique identifier, a request for additional data. The request for additional data may include, for example, data required for the configuration of a smart contract based on the smart contract prototype. For example, the unstructured data may include an instruction such as "Pay my brother $40 when I receive money form my employer". In such examples, the system may determine that "my brother" and/or "my employer" do not have an entry in the address book associated with the first entity. As a result, the system may send, to the client device, a request for additional data including data sufficient to identify a unique identifier associated with "may brother" and/or a "unique identifier associated with "my employer". The system may then receive, from the client device, the additional data, and the smart contract may be configured based on the additional data.

At the operation 514, the system, configures a smart contract based on the LLM output.

With reference again to FIG. 2, in some embodiments, the first server 230 may receive, from the LLM 270, a smart contract. In some embodiments, the smart contract may comprise computer code and the computer code may be written in the Solidity™ programming language.

In some embodiments, the first server 230 may configure a smart contract based on the smart contract prototype. For example, the first server 230 may revise the smart contract prototype using additional data. In this way, the first server 230 may configure a smart contract based on the smart contract prototype.

For example, in some embodiments, the smart contract prototype may include aliases. The smart contract prototype may be based on unstructured data including an instruction such as "Pay John $500 when I receive the money from Amy". The first server 230 may retrieve, from the storage module 350, identifier data including unique identifiers associated with John and Amy. The unique identifiers may be retrieved, for example, from an address book in the storage module 350.

As a further example, the smart contract prototype may be based on unstructured data including an instruction such as "Pay my utility bill as late as possible". The first server 230 may retrieve, from the storage module 350, identifier data including unique identifiers associated with "my utility bill". The unique identifiers may be retrieved, for example, from an address book in the storage module 350. The first server 230 may further retrieve, for example, from the storage module 350, records indicating an amount of the utility bill.

As a still further example, the instruction may be "Pay my Acme bill as cheaply as possible." The first server 230 may retrieve, from the storage module 350, identifier data including unique identifiers associated with "Acme". The unique identifiers may be retrieved, for example, from an address book in the storage module 350. The first server 230 may further retrieve, for example, from the storage module 350, records indicating an amount of the Acme bill.

In some embodiments, prior to deploying the smart contract, the system may send, to the client device associated with the first unique identifier, a request for confirmation. The system may then receive, from the client device, the confirmation.

In some embodiments, subsequent to configuring a smart contract based on the LLM output, the system is further caused to deploy the smart contract on the blockchain network.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computer system for configuring a smart contract based on unstructured data, the computer system comprising:
 a processor;
 a communications module coupled to the processor;
 a storage module coupled to the processor; and
 a memory coupled to the processor, the memory storing instructions that, when executed, configure the processor to:
  receive unstructured data, wherein the unstructured data has been converted, using a speech recognition module, from an audio stream of data;
  identify, based on the unstructured data that has been converted from the audio stream of data, an intent to perform a transfer of data;
  identify, based on the unstructured data that has been converted from the audio stream of data, parameters associated with the transfer of data, the parameters including an amount of data to be transferred, a transferee, and at least one condition associated with the transfer of data;
  retrieve identifier data from the storage module, the identifier data including a first unique identifier associated with a client device and a second unique identifier associated with the transferee;
  send, to a Large Language Model (LLM) via a first prompt engine module and an LLM Application Programming Interface (API), a prompt based on the unstructured data that has been converted from the audio stream of data and the identifier data;
receive LLM output from the LLM; and
based on the LLM output, configure a smart contract and deploy the smart contract to a blockchain network.

2. The computer system of claim 1, wherein prior to deploying the smart contract, the processor is further caused to:
send, to the client device associated with the first unique identifier, a request for confirmation; and
receive, from the client device, the confirmation.

3. The computer system of claim 1, wherein prior to configuring the smart contract, the processor is further caused to:
send, to the client device associated with the first unique identifier, a request for additional data; and
receive, from the client device, the additional data, wherein the smart contract is configured further based on the additional data.

4. The computer system of claim 1, wherein identifying the intent to perform the transfer of data includes:
sending, via a second prompt engine module and the LLM API, the unstructured data to the LLM.

5. The computer system of claim 1, wherein identifying the intent to perform the transfer of data includes:
performing a keyword search of the unstructured data.

6. The computer system of claim 1, wherein identifying the parameters associated with the transfer of data includes:
sending, via a third prompt engine module and the LLM API, the unstructured data to the LLM.

7. The computer system of claim 1, wherein the at least one condition includes a triggering condition, and wherein the triggering condition is used to configure the smart contract.

8. The computer system of claim 1, wherein the at least one condition includes a condition to minimize an input-output modifier.

9. The computer system of claim 1, wherein configuring the smart contract includes:
configuring the smart contract using one or more further LLMs.

10. The computer system of claim 9, wherein configuring the smart contract using the one or more further LLMs includes:
writing the smart contract using a second LLM and translating the written smart contract to a specific blockchain language using a third LLM.

11. The computer system of claim 1, wherein the LLM is a type of artificial intelligence model designed to understand and generate natural-language input.

12. A computer-implemented method, the method comprising:
receiving unstructured data, wherein the unstructured data has been converted, using a speech recognition module, from an audio stream of data;
identifying, based on the unstructured data that has been converted from the audio stream of data, an intent to perform a transfer of data;
identifying, based on the unstructured data that has been converted from the audio stream of data, parameters associated with the transfer of data, the parameters including an amount of data to be transferred, a transferee, and at least one condition associated with the transfer of data;
retrieving identifier data, the identifier data including a first unique identifier associated with a client device and a second unique identifier associated with the transferee;
sending, to a Large Language Model (LLM) via a first prompt engine module and an LLM Application Proqramming Interface (API), a prompt based on the unstructured data that has been converted from the audio stream of data and the identifier data;
receiving LLM output from the LLM; and
based on the LLM output, configuring a smart contract and deploying the smart contract to a blockchain network.

13. The computer-implemented method of claim 12, wherein prior to deploying the smart contract, the method further comprises:
sending, to the client device associated with the first unique identifier, a request for confirmation; and
receiving, from the client device, the confirmation.

14. The computer-implemented method of claim 12, wherein prior to configuring the smart contract, the method further comprises:
sending, to the client device associated with the first unique identifier, a request for additional data; and
receiving, from the client device, the additional data, wherein the smart contract is configured further based on the additional data.

15. The computer-implemented method of claim 12, wherein identifying the intent to perform the transfer of data includes:
sending, via a second prompt engine module and the LLM API, the unstructured data to the LLM.

16. The computer-implemented method of claim 12, wherein identifying the intent to perform the transfer of data includes:
performing a keyword search of the unstructured data.

17. The computer-implemented method of claim 12, wherein identifying the parameters associated with the transfer of data includes:
sending, via a third prompt engine module and the LLM API, the unstructured data to the LLM.

18. The computer-implemented method of claim 12, wherein the at least one condition includes a triggering condition, and wherein the triggering condition is used to configure the smart contract.

19. The computer-implemented method of claim 12, wherein the at least one condition includes a condition to minimize an input-output modifier.

20. The computer-implemented method of claim 12, wherein configuring the smart contract includes:
configuring the smart contract using one or more further LLMs, wherein configuring the smart contract using the one or more further LLMs includes:
writing the smart contract using a second LLM and translating the written smart contract to a specific blockchain language using a third LLM.

21. The computer-implemented method of claim 12, wherein the LLM is a type of artificial intelligence model designed to understand and generate natural-language input.

* * * * *